Aug. 25, 1964  J. H. McCLINTOCK  3,146,192

SELECTIVE SEPARATION OF OIL FROM WATER

Filed Jan. 24, 1962

John H. McClintock INVENTOR

BY Robert J. Pearlman

PATENT ATTORNEY

United States Patent Office 3,146,192
Patented Aug. 25, 1964

3,146,192
SELECTIVE SEPARATION OF OIL FROM WATER
John H. McClintock, Cranford, N.J., assignor to Esso Research and Engineering Company, a corporation of Delaware
Filed Jan. 24, 1962, Ser. No. 168,364
5 Claims. (Cl. 210—40)

The present invention is concerned with a method and apparatus for separating normally liquid hydrocarbon compounds from a liquid of higher specific gravity.

More specifically, the present invention is concerned with a method and apparatus for selectively recovering oil from a liquid of higher specific gravity, such as water.

Numerous mechanical separating devices are known to the art which are capable of separating oil from refinery waste streams with a certain degree of effectiveness. These mechanical devices all have the disadvantage that they rely on the differential gravity of the oil and water to perform the separation. This gives rise to the problem that sudden changes in the level of the oil and/or water tends to result in a poor separation and carry-over of water into the recovered oil product. Also, as a result of these level changes a considerable amount of oil is discharged or carried off with the water stream. Furthermore, these mechanical separation devices are all subject to the limitation that a pool of oil must be present on the surface of the water in order to obtain separation of the oil from water. In the event that the oil is present on the surface of the water in small droplets essentially no separation is obtained.

The present invention, therefore, has as one of its objects to provide a method and apparatus whereby oil is recovered from refinery waste water streams in an extremely efficient manner with a high degree of selectivity. The present invention thus provides a method and apparatus wherein substantially pure oil is recovered with a high degree of efficiency even though the oil is present in droplet form on the surface of the water.

These objects are accomplished by passing a polymeric sheet or film over the surface of the water and thus removing the oil from the water onto the sheet or film by means of the surface attraction between the sheet or film and the oil. Polymeric sheets or films which are suitable for use in the present invention are polyethylene or polypropylene sheets or mixtures thereof. Thus, it has been found that a strong surface attraction exists between polyethylene and polypropylene sheets or films and normally liquid hydrocarbon compounds. That is, by passing a sheet or film as taught by the present invention over the surface of water on which there are liquid hydrocarbon compounds the hydrocarbon compounds are selectively attracted to the sheet or film in preference to the water and are thus removed from the surface of water.

Figure 1:
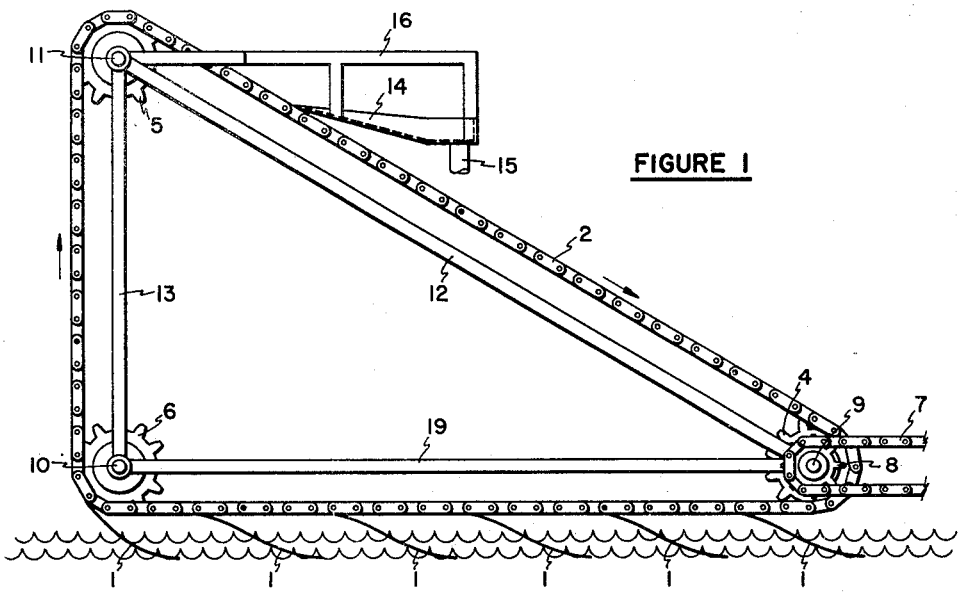
FIGURE 1 is a side view of a specific embodiment of the present invention.

Referring now to the figures in more detail, numeral 1 designates a series of polymeric sheets, such as polyethylene or polypropylene, which are suspended between chains 2 and 3 by any suitable means. Polymeric sheets 1 are pliable so that they tend to conform to the surface of the stream over which they are passed. Polymeric sheets 1 are passed over the surface of the water on which there is oil either as a substantial layer or droplets, by rotating chains 2 and 3 about journals 9, 11 and 10. As shown in FIGURE 1, journals 9, 11 and 10 are arranged in a triangular pattern by means of supports 12, 13 and 19. Sprocket 8, which as shown is molded on journal 9, is driven by chain 7. Chain 7 may be driven by any suitable means known to the art, such as motor or gas engine drivers. Sprocket 8 is molded on journal 9 so as to drive journal 9. This in turn drives sprocket 4 so as to cause chains 2 and 3 to rotate in the manner previously described. Sprockets 5 and 6 on journals 11 and 10 respectively are freely rotatable so as to allow chains 2 and 3 to move, as previously mentioned. Support 16, which is shown suspended from journal 11, supports squeegee 14. Squeegee 14 is in contact with the polymeric sheets or films so as to remove the oil which is on the surface of these sheets or films. The oil flows down squeegee 14 to drawoff pipe 15. Drawoff pipe 15 may be coupled with any suitable device for removing the oil from squeegee 14, such as a flexible conduit or in the case of a stationary separation device a substantially nonflexible conduit.

Figure 2:
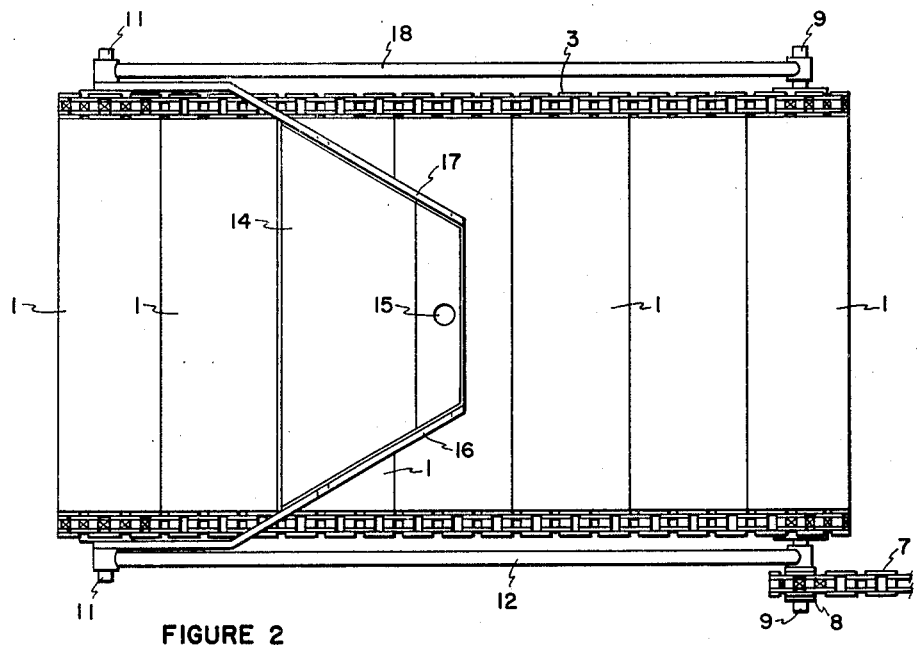
FIGURE 2 is a top view of the specific embodiment of the present invention shown in FIGURE 1.

FIGURE 2, which is a top view of the embodiment of the present invention, merely illustrates the corresponding elements on the lateral side of the device shown in FIGURE 1. For instance, support 18 is subsatntially similar to support 12. Support 17 is substantially the same as support 16. As shown in this embodiment of the present invention, journals 9, 11 and 10 extend through the structure. However, any means for passing the pliable polyethylene sheets or films over the surface of the water known to the art will be satisfactory.

The present invention lies in the discovery that oil may be separated from water by means of the selective attraction between the polymeric sheet or film, such as polyethylene and/or polypropylene and oil. The velocity with which polymeric sheets, film or films are passed over the surface of the water is in the range of about 4 feet per second. Substantially slower speeds can be used without impairing the efficiency of the separation of oil from water. Furthermore, higher speeds may be used. The upper limit to the speed with which the polymeric sheets or films may be passed over the water is dictated by the ability of the sheet or film to retain the oil on its surface so as not to result in excessive waste of oil and is also dictated by the requirement that the sheet or film extend through the oil layer onto the surface of the water. It should be noted that at high velocities the pliable sheets or films tend to skim over the surface of the water in such a manner that substantially no oil removal is obtained. As previously mentioned, the speed of about 4 feet per second should be adequate.

*Example*

It has been found that polyethylene and polypropylene sheets can selectively remove essentially all of the oil from a water surface in the ratio of 1 gram of oil per 16 square inches of polyethylene or polypropylene surface. The oil can be effectively removed by scraping the oil from the sheet or film. Thus, the size and number of polymeric sheets 1 can be determined by one skilled in the art by means of knowing the quantity of oil desired to be removed and the surface of polyethylene or polypropylene film required to remove this quantity of oil. Squeegee 14 may be made of any material suitable for scraping the oil from the surface of polymeric sheets 1. It is desirable that the abrasions between squeegee 14 and polymeric sheets or films 1 be kept to a minimum. However, a metal or a similar polymeric squeegee may satisfactorily be used.

While the present invention has been described with particularity to the specific embodiments shown, it will be appreciated that those skilled in the art can utilize other means for carrying out the method of the present invention without departing from the scope thereof.

What is claimed is:

1. A method of separating oil from an immiscible oil-water mixture comprising passing at least one polymeric sheet having an affinity for said oil over the surface of the water, said sheet being selected from the class of polymers consisting of polyethylene and polypropylene, and withdrawing said polymeric sheet from said oil-water mixture.

2. A method of separating oil from an immiscible oil-water mixture comprising passing at least one polymeric sheet having an affinity for said oil over the surface of the water, said sheet being selected from the class of polymers consisting of polyethylene and polypropylene, withdrawing said polymeric sheet from said oil-water mixture and removing the oil film from said sheet.

3. The method of claim 2 wherein said polymeric sheet is passed over the surface of the water mixture at a rate of about four feet per second.

4. The method of claim 2 wherein the oil is a mineral oil.

5. The method of claim 2 wherein the said oil film is mechanically removed from the said sheet.

References Cited in the file of this patent

UNITED STATES PATENTS

| | | |
|---|---|---|
| 2,765,919 | Juell | Oct. 9, 1956 |
| 2,827,395 | Jordan | Mar. 18, 1958 |
| 2,859,260 | Stiles | Nov. 4, 1958 |
| 2,866,827 | Jurbeleit et al. | Dec. 30, 1958 |